July 28, 1953 W. F. ARCHIBALD 2,647,251
LEVEL INDICATOR
Filed Dec. 19, 1950 2 Sheets-Sheet 1
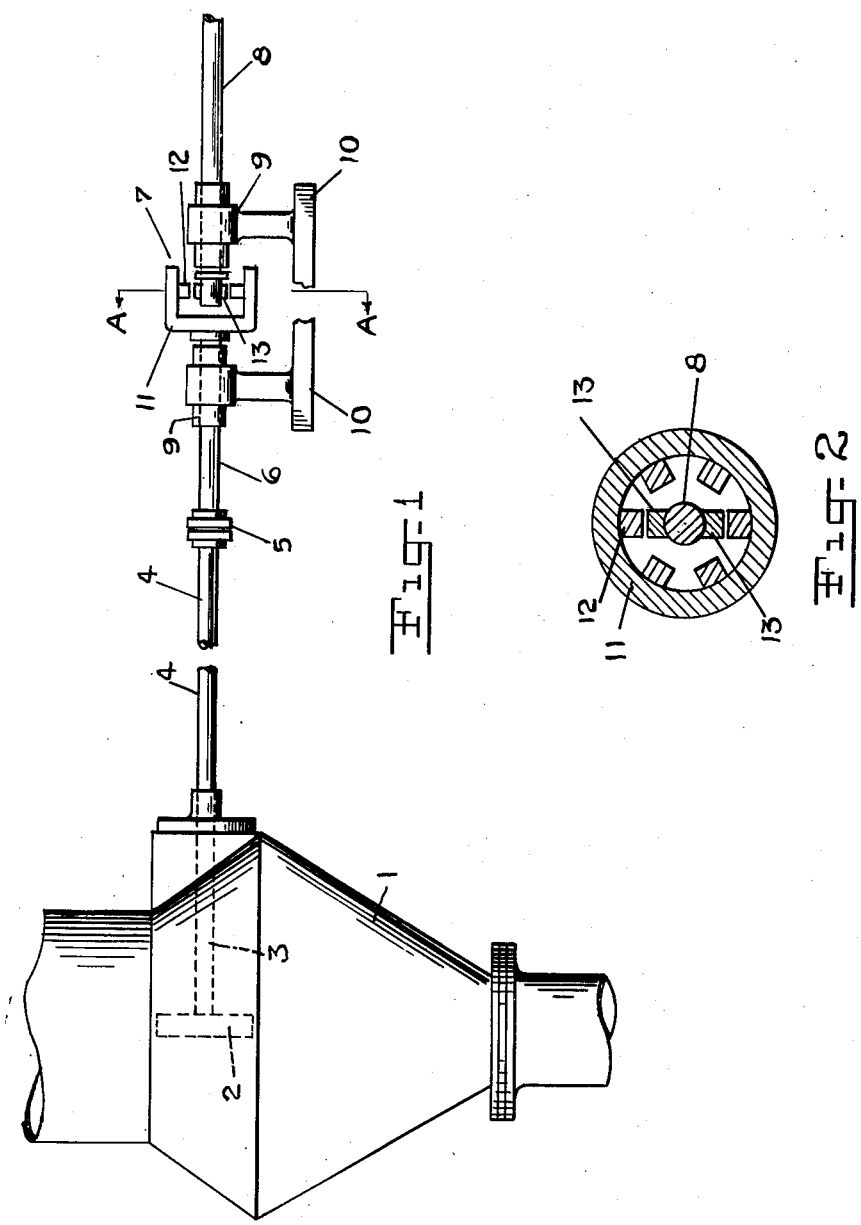
INVENTOR
WILLIAM F. ARCHIBALD
BY
ATTORNEY

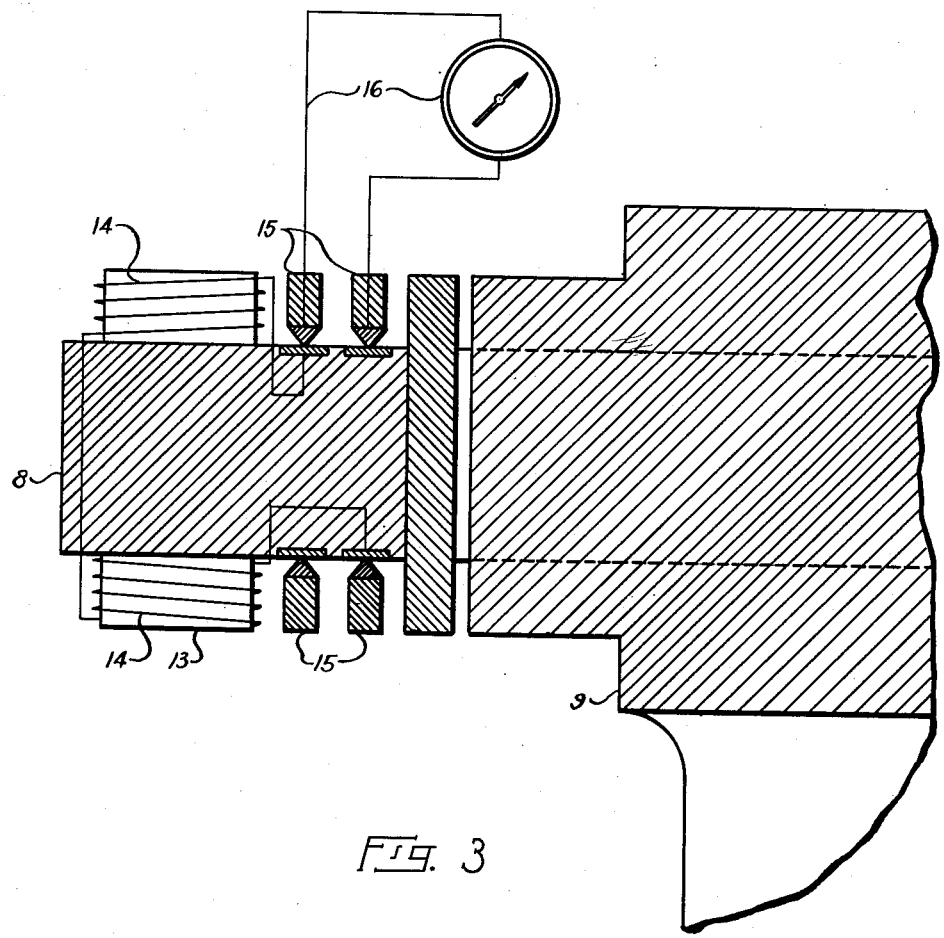

Patented July 28, 1953

2,647,251

UNITED STATES PATENT OFFICE 2,647,251

LEVEL INDICATOR

William F. Archibald, Johannesburg, Transvaal, Union of South Africa, assignor to The Distillers Company Limited, Edinburgh, Scotland, a British company Application December 19, 1950, Serial No. 201,510
In Great Britain December 21, 1949

7 Claims. (Cl. 340—246)

1

The present invention relates to an improved apparatus for indicating the level of solids in enclosed containers, such as hoppers.

In enclosed containers for solid materials, such as grain, coal and the like, it is very often desirable or necessary to have an automatic indicator to show when the solid in the container reaches a certain level, for example when it is either full or empty.

Numerous devices of this nature have been developed in the past, and most of them have not proved completely satisfactory for one reason or another. Thus, for example, in the production of acetylene, the calcium carbide is supplied to the reactor through hoppers positioned adjacent thereto. The operation of the usual type of level indicator requires some form of electrical apparatus adjacent to the hopper, which is undesirable for the reason that the presence of such electrical apparatus near the acetylene generator and in the generator house may lead to serious explosion risks.

It is one object of the present invention to provide an indicator for solid levels in such containers, wherein there need be no electrical equipment immediately adjacent thereto.

In the accompanying drawing:

Figure 1 is a diagrammatic cross-sectional view of the apparatus according to the present invention and Figure 2 is a cross section (not to scale) along the lines AA in Figure 1.

According to the present invention the apparatus for indicating the levels of solids comprises a rotatable member, resembling a paddle, positioned in the container for the solids, the shaft of said rotatable member being connected to a driving shaft through a magnetic coupling, said apparatus being provided with indicating and/or controlling means actuated by the voltage generated at the magnetic coupling in response to the resistance offered to the rotation of the rotatable member by the presence of solid material in the container at or above the level of said rotatable member.

The torque available to drive said rotatable member can be readily adjusted, from a remote position if desired, which once so adjusted will remain constant. By using suitable bearings, preferably ball bearings, and proper lubrication, the friction load at the rotatable member shaft can be reduced to a negligible value relative to the resistance offered by the material to be detected, and thus the device can be made very sensitive if so required. On the other hand, the torque applied to the magnetic coupling could be increased to any value required to overcome any friction in the system with any margin over this value considered to be necessary.

Referring to the drawing,

Figure 1 shows a hopper 1 adapted to contain solids such as particulate calcium carbide provided at its upper part with a paddle 2 carried by a shaft 3 contained within the hopper. This shaft leaves the hopper through a packed gland to ensure that gases cannot escape at the union, and is uniform with a flexible shaft 4 of some length, which is connected through the flexible coupling 5 to the shaft 6. This shaft 6 is connected through the magnetic coupling 7 to a shaft 8 which is mechanically driven by means not shown. The shafts 6 and 8 are held in the sleeves 9 supported on a rigid baseplate 10. The shaft 6 carries a spider 11 carrying internally six pole pieces 12, with the radial centre lines of adjacent pole pieces being at 60° to one another. The shaft 8 carries externally two pole pieces 13 with their radial centre lines at 180° to one another. The air gap between the pole pieces 12 and 13 in the closest relative position is 0.005 inch.

The advantage of employing a level indicator according to the present invention is that the transmission of torque to the shaft of the rotatable member can be made conveniently from a considerable distance, for example, either by extending said shaft in line with its axis or by introducing a flexible shaft element between said shaft and the shaft of the magnetic coupling. By these means the magnetic coupling, which requires the electric supply, can be placed at a considerable distance from the level indicator itself.

The rotatable member is most suitably in the form of a paddle.

In the operation of the device according to the present invention, when the level of solid in the container is below the level of said rotatable member, it will thus be able to rotate in the normal way, and no voltage will be generated at the magnetic coupling. When the level of solid in the container rises to and above the level of said rotatable member, the rotation of said member will be resisted and finally prevented and consequently voltage will be generated at the magnetic coupling, and the presence of material at the level of said rotatable member can be indicated by employing the so generated voltage, suitably to actuate some signal or control device.

One suitable form of magnetic coupling comprises the paddle shaft and the drive shaft mounted coaxially on a rigid bedplate; one shaft carrying externally two pole pieces with their radial centre lines at 180° to one another, and the other shaft, through a spider, carrying internally six pole pieces with the radial centre lines of adjacent pole pieces being at 60° to one another. The radial axes of all pole pieces are in the same plane and the dimensions of the pole pieces are such as to allow mechanical clearance between the two sets of pole pieces in all positions. The air gap between the two sets of pole pieces in the closest relative position is suitably about 0.005 inch.

All the pole pieces are fitted with field pick-up coils 14 in Figure 3 and the coils on the pole pieces attached to each shaft are connected in series with each other, and the extreme coil ends of the set of pole pieces on each shaft are connected to sliprings attached to the shaft in question. The set of sliprings on one shaft is connected to a direct current supply and the set of sliprings 15 in Figure 3 on the other shaft is connected to a detecting circuit 16 in Figure 3 responsive to alternating voltages. One shaft is mechanically connected to suitable driving means and the other shaft is mechanically connected to the rotatable member in the solids container.

The magnetic field due to the coils connected to the direct current supply induces magnetic poles in the pole pieces on which they are wound and thus induces poles of opposite polarity in the pole pieces attached to the other shaft. When the shaft to be attached to the rotatable member is free to turn the attraction between the opposite poles causes it to follow the driven shaft at the speed of the driven shaft, and under those conditions the magnetic flux in the said magnetic coupling is constant and no voltage is generated in the coils not connected to the D. C. supply. However, when the shaft connected to the rotatable member is unable to turn the change of magnetic flux as the moving set move towards and away from the fixed set of poles causes an alternating voltage to be generated in the coils, which can be simply picked up and used for indicating and/or controlling purposes.

This generated voltage can be used as indicated above, simply to operate a signal from which an operator will carry out any necessary action, such as either filling the container or emptying it, but more suitably the generated voltage is used to stop or start the motor employed for filling said container, or alternatively, to open or shut the valves connected therewith.

A suitable application of the device according to the present invention is to indicate the level of calcium carbide in the hoppers used to supply calcium carbide to an acetylene generator.

I claim:

1. An apparatus suitable for indicating the level of solids in a container which comprises a rotatable member resembling a paddle, the shaft of said rotatable member being connected through a magnetic coupling to a shaft adapted to be driven, said rotatable member being adapted to be positioned in said container, and indicating means adapted to be actuated by the voltage generated at the magnetic coupling in response to the resistance offered to the rotation of the rotatable member by the presence of solid material in the container.

2. An apparatus as in claim 1 wherein the shaft of said rotatable member is of a length such that the magnetic coupling may be placed at a distance from the rotatable member.

3. An apparatus as in claim 1 wherein the apparatus is also suitable for controlling the level of solids in the container, and such controlling means are adapted to be actuated by the voltage generated at the magnetic coupling in response to the resistance offered to the rotation of the rotatable member by the presence of solid material in the container.

4. An apparatus suitable for controlling the level of solids in a container which comprises a rotatable member resembling a paddle, the shaft of said rotatable member being connected through a magnetic coupling to a shaft adapted to be driven, said rotatable member being adapted to be positioned in said container, and controlling means adapted to be actuated by the voltage generated at the magnetic coupling in response to the resistance offered to the rotation of the rotatable member by the presence of solid material in the container.

5. An apparatus for indicating the level of solids in a container which comprises a rotatable member resembling a paddle, positioned in the container for the solids, the shaft of said rotatable member being connected to a driving shaft through a magnetic coupling, said apparatus being provided with indicating means actuated by the voltage generated at the magnetic coupling in response to the resistance offered to the rotation of the rotatable member by the presence of solid material in the container at or above the level of said rotatable member.

6. Apparatus for indicating the level of solids in a container which comprises a rotatable paddle-like member disposed in said container, a horizontal shaft for rotating said paddle-like member extending laterally outwardly through said container, a driven shaft aligned with said first shaft and mechanically unconnected thereto, a magnetic coupling for the adjacent ends of such shafts adapted to generate voltage dependent upon the resistance to rotation of said rotatable paddle-like member and indicating means adapted to be actuated by the voltage generated at the magnetic coupling.

7. Apparatus for indicating the level of solids in a container in accordance with claim 6 in which the magnetic coupling includes a spider on the end of one shaft and having inwardly directed pole-pieces and externally arranged pole pieces on the adjacent end of the other shaft, there being an air gap between the spider pole pieces and the shaft pole pieces in all relative positions thereof to the extent of at least 0.005 inch.

WILLIAM F. ARCHIBALD

References Cited in the file of this patent

UNITED STATES PATENTS

| Number | Name | Date |
|---|---|---|
| 1,690,243 | Parrish | Nov. 6, 1928 |
| 2,371,511 | Faus | Mar. 13, 1945 |
| 2,387,901 | Haverstick | Oct. 30, 1945 |

FOREIGN PATENTS

| Number | Country | Date |
|---|---|---|
| 486,075 | Great Britain | May 30, 1938 |